United States Patent [19]

Cordell

[11] 4,415,857

[45] Nov. 15, 1983

[54] NON-POLARIZING ELECTRODE SYSTEM FOR GEOPHYSICAL PROSPECTING AND THE LIKE

[75] Inventor: Ralph L. Cordell, Tulsa, Okla.

[73] Assignee: Standard Oil Company, Chicago, Ill.

[21] Appl. No.: 183,477

[22] Filed: Sep. 2, 1980

Related U.S. Application Data

[63] Continuation of Ser. No. 933,005, Aug. 11, 1978, abandoned.

[51] Int. Cl.³ .............................................. G01V 3/20
[52] U.S. Cl. ..................... 324/357; 324/366
[58] Field of Search ................. 324/347, 354-363, 324/366, 367, 369-371, 373-376

[56] References Cited

U.S. PATENT DOCUMENTS

| | | | |
|---|---|---|---|
| 2,172,778 | 9/1939 | Taylor | 324/354 |
| 2,237,643 | 4/1941 | West | 324/357 |
| 2,802,173 | 8/1957 | Nisle | 324/376 |
| 2,871,444 | 1/1959 | Piety | 324/347 |
| 2,941,784 | 6/1960 | Martin | 324/369 |
| 3,113,265 | 12/1963 | Woods et al. | 324/357 |
| 3,798,534 | 3/1974 | Schuster | 324/373 |
| 3,975,676 | 8/1976 | Bliamptis | 324/354 |

*Primary Examiner*—Gerard R. Strecker

[57] ABSTRACT

In electrical geophysical prospecting and in well-logging, in which potential is applied to the earth to cause direct current (or low frequency alternating current) to flow between spaced electrodes and the potential is measured between other electrodes contacting the earth, difficulties are experienced due to the electrode chemistry at the electrode contacts with the earth. This phenomenon is usually called polarization, with spontaneous, usually varying potential being generated at the electrode contact. I have found it possible to use pairs of relatively closely spaced solid conductor electrodes instead of the individual electrodes formerly used, applying an alternating voltage between the two electrodes of each pair which minimizes polarization, and coupling the direct or low frequency A.C. potential between two such pairs either in applying a measuring current to the earth or in determining the resultant potential between other similarly arranged pairs of solid conductor electrodes in contact with the earth and also biased with alternating voltage. The alternating bias current is at least of the order of magnitude and perferably somewhat greater than the direct current in an electrode.

14 Claims, 3 Drawing Figures

NON-POLARIZING ELECTRODE SYSTEM FOR GEOPHYSICAL PROSPECTING AND THE LIKE

This is a continuation of application Ser. No. 933,005, filed Aug. 11, 1978, now abandoned.

BACKGROUND OF THE INVENTION

Electrical methods of geophysical prospecting have been known for a considerable period of time. Leaving aside self-potential methods, the systems ordinarily employ either an alternating current or direct current power source to apply electric current to the ground between two spaced electrodes. The resultant potential drop is measured either between these electrodes or between other electrodes spaced from them.

Generally speaking, when a solid conductor such as a metal stake or the like is applied to the earth, the chemical make-up of the earth at the particular point and the concentration and kind of ions in the water in pores in the earth cause varying potentials to be generated at the electrode contacts, and also affect the resistance between the conductor and the earth. These two phenomena are usually called polarization. It was found years ago that if the earth were energized with alternating current instead of direct current, the amount of polarization at the contact of electrodes with the ground was very much reduced. However, if the spacing between the electrodes was greater than a few feet, the phenomenon known as "skin effect" was present, that is, the inductive effects of the alternating current flowing to the earth were such that there was considerable modification of the paths of current flow, differing widely from that found when direct current was used. In general, skin effect caused the major path or average path of current flow through the earth to be much more limited to the direct line path between the power electrodes than was the case when direct currents were employed.

As various investigators discovered that it was possible to cope with the polarization problem if one wished to obtain the deep penetration with direct current electrode arrangements by allowing polarization to occur at the power electrodes, and by employing what are termed "porous pot electrodes" at the contact points between which the potential was to be measured. This arrangement has been described well in a number of applied geophysics textbooks, for example in that of J. J. Jakosky, "Exploration Geophysics," published by Times-Mirror Press, Los Angeles, Calif. (1940). Basically one employed a permeable ceramic pot, usually in the shape of a right cylinder with an open top. The inside of the pot held a saturated solution of the salt of some metal, and an electrode of that particular metal was immersed in the solution, giving as much surface contact as possible. Under steady state conditions, these electrodes could be planted on the earth's surface with relatively negligible generated polarization voltage between them. Of course, they could not be employed for ordinary electric well logging, since the hydrostatic pressure of the well fluids surrounding such an electrode would force the well liquids into the pot. In well logging, accordingly, ordinary procedure is to use relatively close spacing between power and potential electrodes, metal electrodes, and alternating potential, the frequency of which usually was above that of the 50–60 Hz power range, but ordinarily only a few hundred hertz, say 400 Hz.

Aside form the nonpolarizing porous electrodes described above, I have been unable to find in a careful search of the literature (including patents dealing with electric surface prospecting and well logging) any variety of nonpolarizing electrode system.

SUMMARY OF THE INVENTION

Basically my invention comprises the use of pairs of solid conductors between which a biasing alternating current flows upon contact with the earth, as an individual electrode for electrical geophysical prospecting or well logging. I prefer to employ direct current for the measurement current, although very low frequency alternating current, for example, not above 20 or 30 Hz can be employed. The biasing alternating current of each electrode pair is at least of the order of magnitude of the direct current or very low frequency alternating current employed in making the measurements, and preferably is somewhat greater than such current. The frequency of the biasing alternating current should be considerably different from that employed in the measuring circuit for simplicity in measurement, i.e., for insuring that the biasing current does not affect the measuring instruments employed. It may, for example, conveniently be of the order of power frequency (50 to 60 Hz) or a few hundred hertz, for example, 400 to 600 Hz but preferably not above approximately 1000 Hz.

BRIEF DESCRIPTION OF THE DRAWINGS

A complete understanding of the present invention and of the advantages thereof may be gained from a consideration of the description of two embodiments of the invention in connection with which the accompanying drawings have been made. These drawings form a part of this specification and are to be read in conjunction therewith. In these drawings like identifying numbers correspond to like elements, and.

DETAILED DESCRIPTION

Figure 1:
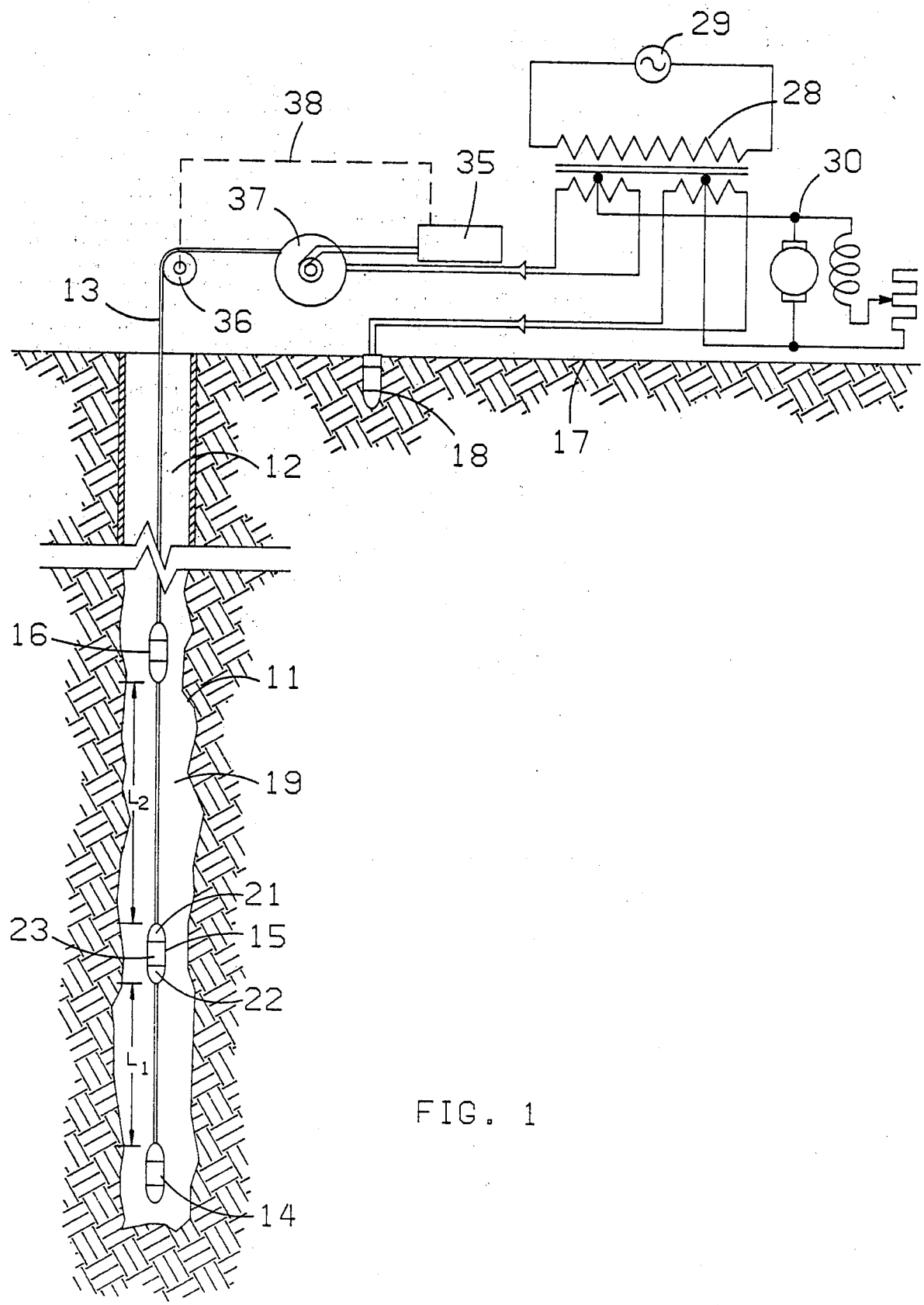
FIG. 1 is a diagrammatic view of a well survey method conducted in accordance with one embodiment of my invention.

FIG. 1 shows in highly diagrammatic form an arrangement of apparatus in accordance with my invention applied in the field of electric well logging of a type in which the nonpolarizing electrode system shown has special advantage. It was well-known that the electrode spacing in most varieties of electric resistivity well logging was of the order of inches to as much as but rarely exceeding 2 or 3 feet. Since the average depth of penetration of the current employed in making the measurement is generally speaking (depending somewhat on the electrode configuration) of the order of the electrode spacing to 2 or 3 times this value, it is seen that the electric effects measured at the potential electrodes could not expect to take into account much of the adjacent rock formations beyond a distance of the order of 3 to perhaps 10 feet. In the petroleum industry, it is occasionally desirable to use a system of well logging in which the effective penetration of the prospecting system is greatly in excess of this, particularly when one is trying to investigate perpendicular to the axis of the wellbore at a depth of 100 to 1000 feet or so. This, for example, is the case when one is attempting to locate the flanks of a salt dome in the vicinity. In this case, one wishes to employ ultra-long spaced electric logging (ULSEL) in which the spacing between the power electrode and the first potential electrode is of the order of 100 to 1000 feet or more. With reference to FIG. 1 which illustrates such a ULSEL system, the uncased portion 11 of a well 12 is being surveyed using an electric cable 13 supporting a current electrode 14 at the bottom of the cable, above which at a distance $L_1$ is located a first potential electrode 15, and a distance $L_2$ above this is located a second potential electrode 16. The second current electrode 18 is located somewhere in the vicinity of the wellhead, for example, buried in ground at the surface 17 (see location of electrode 18). The electric cable 13 is a multiconductor cable with the conductors well insulated from each other and from possible penetration by the well fluids in the region 19 within the bore of well 11, as is well-known in the art. It is also well understood that when using this arrangement, ordinarily the length $L_2$ is made several times the length $L_1$, for example, 5 to 50 times $L_1$. In this case, the difference of potential between electrodes 15 and 16 due to the current flowing between electrodes 14 and 18 can be considered to a first approximation to be effected chiefly by the resistive nature of the formation in a sphere centered at electrode 14 and a radius of length somewhere between $L_1$ and $2L_1$.

In accordance with this invention, each of the electrodes in this arrangement physically comprises two solid conductor portions (for example, 21 and 22 of electrode 15) separated electrically by a central insulator 23.

Figure 2:
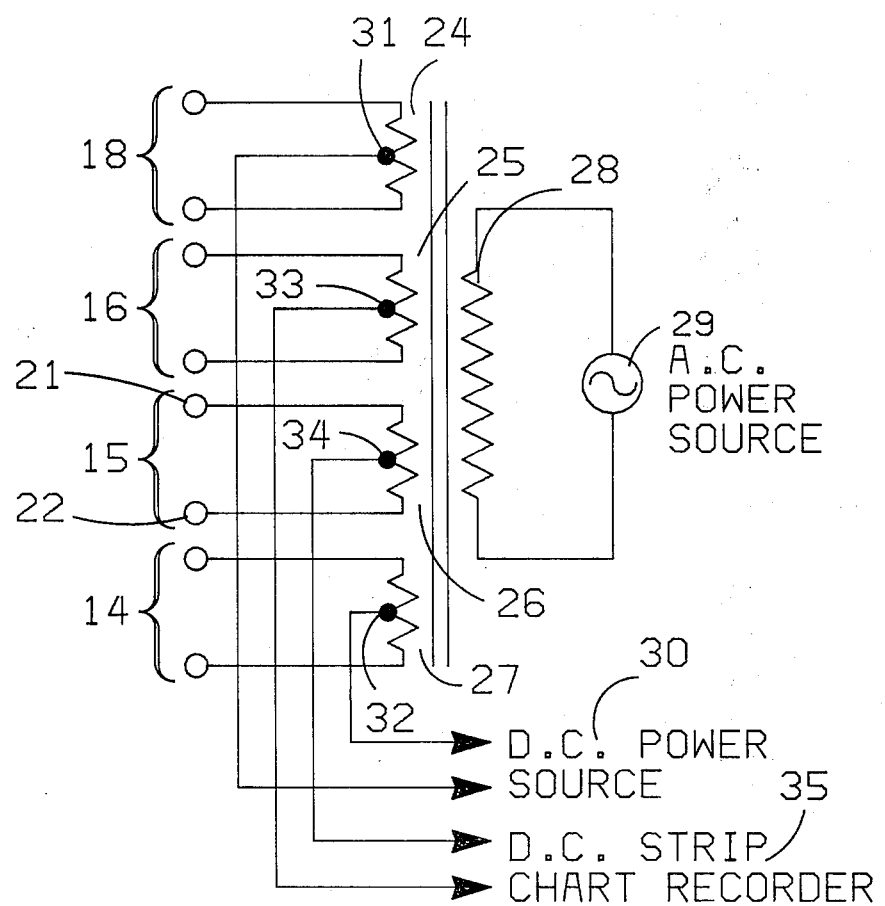
FIG. 2 is a schematic diagram of the wiring connections employed in the well logging arrangements shown in FIG. 1.

As can be better seen in the schematic diagram of FIG. 2, the pairs of solid conductor electrodes forming the electrodes 14, 15, 16, and 18 each have applied to them an alternating potential from the individual secondaries 24 to 27 of a power transformer 28 suitably fed from an A.C. power source 29. Since these electrodes are in contact with the earth which does not possess infinite electric resistance, an alternating current or biasing current will flow between the two conductors forming electrode 14, and similar alternating currents will flow between the pairs forming electrodes 15, 16, and 18.

The magnitudes of the individual biasing currents are not particularly of importance. In my invention, I have found that it is highly desirable that the alternating current (biasing current) of the current flowing from one solid conductor forming a part of electrode 15, for example, should be at least of the order of magnitude of the measuring current (and preferably somewhat greater than such current) at the electrode. In the embodiment shown in FIG. 2, the measuring power source is shown to be a DC source 30 (shown also in FIG. 1) which is applied to the electrodes by being applied between the center taps 31 and 32 of secondaries 24 and 27, respectively. I have found that under these circumstances that the pair of solid conductors forming electrode 14 and those forming electrode 18 each act as an essentially nonpolarizing electrode very satisfactorily conveying the direct current due to the DC power source 30 between electrodes 14 and 18. The direction of polarity of the power source 30 becomes of no particular importance under this circumstance.

When one of my electrode pair arrangements is employed as a potential-measuring electrode rather than as one applying measuring current to the ground, I want the peak of the A.C. biasing potential to be at least of the order as the difference in potential being measured and preferably have the rms biasing potential at least as great as the measured potential. Thus, in FIG. 1 and FIG. 2 the potential across transformer secondaries 25 and 26 should have a peak value at least of the order of the d.c. potential between the center taps of these secondaries and more desirably the rms voltage of each of these secondaries should be as great as the d.c. potential.

Similarly, center taps 33 and 34 of secondaries 25 and 26 of transformer 28 which supply the AC biasing current to electrodes 16 and 15 respectively form the electrodes between which the DC potential in this well logging embodiment is measured. Accordingly, these center taps are connected to the DC strip chart voltage recorder 35. As is well known in this art, the strip chart on which the record of the potential drop of electrodes 15 and 16 is recorded for observation is ordinarily moved in synchronism with the motion of the electrodes in the well. For example, one passes the cable 13 over a measuring sheave 35 which deflects the cable to the take-up reel 37. A mechanical take-off from the axle of the sheave 36 is then employed as the strip chart drive. This is shown as broken line 38, FIG. 1.

The ends of the conductors making up cable 13 are brought into the secondaries of the power transformer 28 by means of slip rings (mostly not shown) on the take-up reel 37, again as is very well-known in this art. FIG. 1 shows this only schematically; the electrical connections are more clearly indicated in FIG. 2.

It is to be understood that one could employ a very low frequency alternating potential power source instead of the DC power source 30, although there is little advantage in doing this. In that case, the DC strip chart recorder 35 would be replaced with a recording AC potentiometer operative at that frequency.

In any case, the power source 30 and recorder 35 are operated at a frequency much below that of the AC power source 29. As has been mentioned above, for example, the AC power source 29 may be at a frequency of 400 to 1000 Hz, while the power source 30 is preferably DC and, if AC, is not over about 30 Hz.

It is to be understood that since the alternating current bias is applied to relatively closely spaced electrodes (I prefer that the insulator 23 separating electrode components 21 and 22, for example, be at most of the order of a foot or so and preferably of the order of only a few inches), very low power is required to supply bias current of the same magnitude as that of the applied direct current. With the arrangement shown, ordinarily a power supply of only a few watts at most is required. It is seen that the spacing between the electrode components for each pair is of the order of 1/50 or less the spacing between the adjacent electrodes, for example, the spacing $L_1$.

Figure 3:
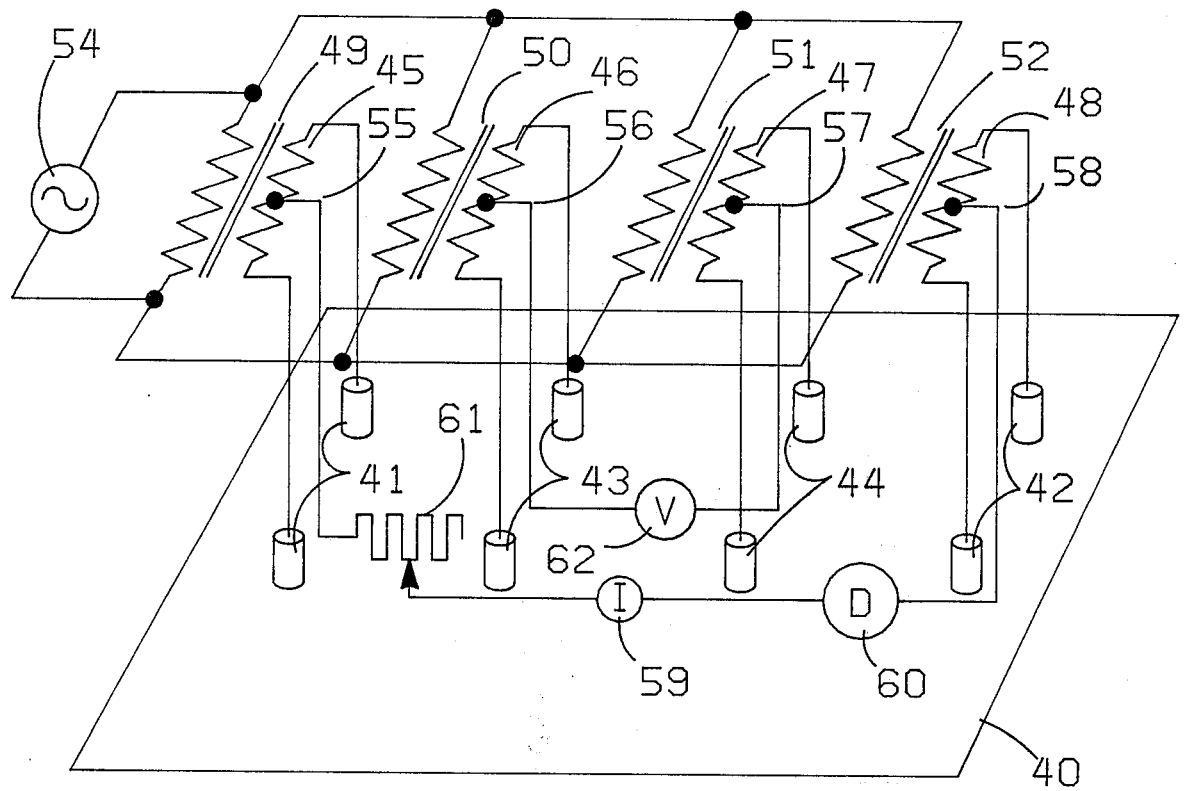
FIG. 3 shows partly in isometric form a symbolic representation of a second embodiment of my invention applied in surface electric prospecting.

In FIG. 3 is shown a second embodiment of the invention, applied to an otherwise conventional surface electrical prospecting arrangement. Here the surface of the earth represented by reference number 40 is a boundary of current flow between two pairs 41 and 42 of solid, conducting, closely-spaced electrodes which have been driven into the surface of the earth 40. Two other pairs of similar electrodes 43 and 44 are employed to pick up the potential between the center third of the spacing between electrodes 41 and 42. As shown in FIG. 3, the secondaries 45, 46, 47, and 48 of 4 transformers 49 to 52 connect respectively the electrode pairs 41, 43, 44, and 42. The primaries of these transformers are connected in parallel across an A.C. source 54 so that an alternating current bias flows between the electrodes making up each electrode pair. As already stated, it is desired to have this biasing current of the same order of magnitude or greater than the amplitude of the measuring current which in this case would be the current applied to the center taps 55 and 58 of the transformer secondaries 45 and 48. This is the current I measured by the ammeter 59 shown in series with the D.C. dynamo 60. The strength of the D.C. signal may be adjusted or regulated by rheostat 61. A potentiometer or other accurate means of determining potential 62 is connected between center taps 56 and 57. This is an arrangement for surface electric prospecting called the Wenner or Gish-Rooney configuration. The electrodes of my invention are, of course, capable of employment with any other type of configuration for surface prospecting.

As with the earlier embodiment, it is desirable that the frequency of the biasing potential obtained from the A.C. source 54 be high compared to that of the dynamo used for the measuring current. If, as shown in FIG. 3, D.C. is employed in the measuring circuit, the A.C. source 54 may be of power frequency, for example 50 to 60 Hz. On the other hand, if one employs a low-frequency alternating current source instead of a D.C. dynamo for source 60, (for example, with frequency of the order of 10 to 30 Hz), it is desirable that the frequency of the A.C. source 54 be at least 100 Hz and preferably in the order of 400 to 1000 Hz.

In practice the electrode pairs may be physically made up of two rods bound together in a sort of "sandwich," with an insulating strip between them, so that one can plant this composite or "sandwich" rod with one operation, rather than separately driving two stakes as shown in FIG. 3.

In all events, the arrangement shown in FIG. 3 is an embodiment of an electric prospecting system in which nonpolarizing electrodes are used for the application of the electric current I into the earth. As in the previous embodiment, it is preferred to have close spacing between the two electrodes making the electrode pair compared to the spacing between adjacent electrodes. I prefer to have the space between the two electrodes 41 preferably not over 2% of the distance from electrode 41 to electrode 43, for example. Also, while I have shown in both embodiments of the invention, the measuring circuits applied to the center taps of the secondaries of the respective transformers energizing the bias current, it is to be understood that it is not essential that a center tap be used, as long as the measuring circuit is coupled to the electrode pair.

There are a number of variations in arrangements of apparatus physically equivalent to that which has been already shown and described. It is to be understood that these are considered to be within the scope of the broad invention, which is best defined in the appended claims.

I claim:

1. A combined non-polarizing electrode system for geophysical prospecting, well logging, and the like, comprising:
    a first adjacent pair of electrodes connected to opposite ends of a first secondary winding of an alternating current transformer;
    second, third, and fourth adjacent pairs of electrodes connected, in a manner similar to the connection of said first pair of electrodes, to second, third, and fourth secondary windings, respectively, of said alternating current transformer;
    a depolarizing alternating current source connected to the primary winding of said alternating current transformer;
    a direct current power source connected between said first and fourth secondary windings for generating a measuring current in the earth between said first pair of electrodes and said fourth pair of electrodes, said first and fourth pair of electrodes being spaced a distance L apart;
    a direct current measuring device connected in series with said direct current power source for measuring said measuring current; and
    a direct voltage measuring device connected between said second and third secondary windings for measuring a potential difference in the earth caused by the flow of said measuring current between said second pair of electrodes and said third pair of electrodes, said second and third pairs of electrodes being spaced intermediate said first and fourth pairs of electrodes, whereby said direct voltage measurement in combination with said direct current measurement provides an indication of the resistivity of the earth between said second and said third electrode pairs, and said depolarizing alternating current source causes a depolarizing alternating current to flow between said adjacent pairs of electrodes.

2. A combined non-polarizing electrode system for geophysical prospecting, well logging, and the like, comprising:
    a first adjacent pair of electrodes connected to opposite ends of a first secondary winding of an alternating current transformer;
    second, third, and fourth adjacent pairs of electrodes connected, in a manner similar to the connection of said first pair of electrodes, to second, third, and fourth secondary windings, respectively, of said alternating current transformer;
    a depolarizing alternating current source connected to the primary winding of said alternating current transformer;
    a low-frequency alternating current source connected between said first and fourth secondary windings for generating a measuring current in the earth between said first pair of electrodes and said fourth pair of electrodes, said first and fourth pairs of electrodes being spaced a distance L apart;
    a low-frequency alternating current measuring device connected in series with said low-frequency alternating current source for measuring said measuring current; and
    a low-frequency alternating voltage measuring device connected between said second and third secondary windings for measuring a potential difference in the earth caused by the flow of said measuring current between said second pair of electrodes and said third pair of electrodes, said second and third pairs of electrodes being spaced intermediate said first and fourth pairs of electrodes, whereby said low-frequency alternating voltage measurement in combination with said low-frequency alternating current measurement provide indication of the resistivity of the earth between said second and third electrode pairs, and said depolarizing alternating current source causes a depolarizing alternating current to flow between said adjacent pairs of electrodes.

3. The systems of claims 1 or 2 wherein said depolarizing alternating current has a magnitude substantially similar to that of said measuring current.

4. The system of claim 2 wherein the frequency of the depolarizing alternating current is not less than ten times that of the measuring current.

5. A method for geophysical prospecting, well logging, and the like, wherein a non-polarizing electrode system is employed comprising the steps of:
   connecting a first adjacent pair of electrodes to opposite ends of a first secondary winding of an alternating current transformer;
   connecting second, third, and fourth adjacent pairs of electrodes in a manner similar to the connection of said first pair of electrodes, to second, third, and fourth secondary windings, respectively, of said alternating current transformer;
   connecting a depolarizing alternating current source to the primary winding of said alternating current transformer;
   connecting a current source between said first and fourth secondary windings for generating a measuring current in the earth between said first pair of electrodes and said fourth pair of electrodes, said first and fourth pair of electrodes being spaced a distance L apart;
   connecting a current measuring device in series with said current source for measuring the magnitude of said measuring current;
   connecting a voltage measuring device between said second and third secondary windings for measuring a potential difference in the earth caused by the flow of said measuring current between said second pair of electrodes and said third pair of electrodes, said second and third pairs of electrodes being spaced intermediate said first and fourth pairs of electrodes;
   determining the resistivity of the earth between said second and third electrode pairs by calculating the ratio of said voltage measurement to said current measurement, wherein said resistivity is accurately measured due to the depolarization of said four pairs of electrodes caused by said depolarization alternating current flowing between said adjacent pairs of electrodes.

6. The method of claim 5 wherein said measuring current source comprises a direct current source.

7. The method of claim 5 wherein said measuring current source comprises a low-frequency alternating current source.

8. The method of claim 7 wherein said depolarizing alternating current source operates at a frequency substantially greater than that of said measuring current source frequency.

9. The methods of any of claims 5 through 8 wherein said depolarizing alternating current has a magnitude substantially similar to that of said measuring current.

10. The method of claim 7 wherein the frequency of the depolarizing alternating current is not less than ten times that of said measuring current.

11. A combined non-polarizing electrode system for geophysical prospecting, well logging, and the like, comprising:
   a first adjacent pair of electrodes connected to opposite ends of a first secondary winding of an alternating current transformer;
   a second adjacent pair of electrodes connected to opposite ends of a second secondary winding of said alternating current transformer;
   a depolarizing alternating current source connected to the primary winding of said alternating current transformer;
   a direct current power source connected between said first and second secondary windings for generating a measuring current in the earth between said first pair of electrodes and said second pair of electrodes, said first and second pair of electrodes being spaced a distance L apart;
   a direct current measuring device connected in series with said direct current power source for measuring said measuring current; and
   a direct voltage measuring device for measuring a potential difference in the earth caused by the flow of said measuring current between the electrodes of said direct voltage measuring device, said direct voltage measuring device electrodes being spaced intermediate said first and second pairs of electrodes, whereby said direct voltage measurement in combination with said direct current measurement provides an indication of the resistivity of the earth between said direct voltage measuring device electrodes and said depolarizing alternating current source causes a depolarizing alternating current to flow between said adjacent pairs of electrodes.

12. A combined non-polarizing electrode system for geophysical prospecting, well logging, and the like, comprising:
   a first adjacent pair of electrodes connected to opposite ends of a first secondary winding of an alternating current transformer;
   a second adjacent pair of electrodes connected to opposite ends of a second secondary winding of said alternating current transformer;
   a depolarizing alternating current source connected to the primary winding of said alternating current transformer;
   a low-frequency alternating current source connected between said first and second secondary windings for generating a measuring current in the earth between said first pair of electrodes and said second pair of electrodes, said first and second pairs of electrodes being spaced a distance L apart;
   a low-frequency alternating current measuring device connected in series with said low-frequency alternating current source for measuring said measuring current; and
   a low-frequency alternating voltage measuring device for measuring a potential difference in the earth caused by the flow of said measuring current between the electrodes of said low-frequency alternating voltage measuring device, said electrodes of said low-frequency alternating voltage measuring device being spaced intermediate said first and second pairs of electrodes, whereby said low-frequency alternating voltage measurement in combination with said low-frequency alternating current measurement provide indication of the resistivity of the earth between said low-frequency alternating voltage measuring device electrodes, and said depolarizing alternating current source causes a depolarizing alternating current to flow between said adjacent pairs of electrodes.

13. A combined non-polarizing electrode system for geophysical prospecting. well logging, and the like, comprising:
- a first adjacent pair of electrodes connected to opposite ends of a first secondary winding of an alternating current transformer;
- a second adjacent pair of electrodes connected to opposite ends of a second secondary winding of said alternating current transformer;
- a depolarizing alternating current source connected to the primary winding of said alternating current transformer;
- a direct current power source for generating a measuring current in the earth between a third and a fourth electrode, said third and fourth electrodes being spaced a distance L apart;
- a direct current measuring device connected in series with said direct current power source for measuring said measuring current; and
- a direct voltage measuring device connected between said first and second secondary windings for measuring a potential difference in the earth caused by the flow of said measuring current between said first pair of electrodes and said second pair of electrodes, said first and second pairs of electrodes being spaced intermediate said third and fourth electrodes, whereby said direct voltage measurement in combination with said direct current measurement provides an indication of the resistivity of the earth between said first and said second electrode pairs, and said depolarizing alternating current source causes a depolarizing alternating current to flow between said adjacent pairs of electrodes.

14. A combined non-polarizing electrode system for geophysical prospecting, well logging, and the like, comprising:
- a first adjacent pair of electrodes connected to opposite ends of a first secondary winding of an alternating current transformer;
- a second adjacent pair of electrodes connected to opposite ends of a second secondary winding of said alternating current transformer;
- a depolarizing alternating current source connected to the primary winding of said alternating current transformer;
- a low-frequency alternating current source for generating a measuring current in the earth between a third and a fourth electrode, said third and fourth electrodes being spaced a distance L-apart;
- a low frequency alternating current measuring device connected in series with said low-frequency alternating current power source for measuring said measuring current; and
- a low-frequency alternating voltage measuring device connected between said first and second secondary windings for measuring a potential difference in the earth caused by the flow of said measuring current between said first pair of electrodes and said second pair of electrodes, said first and second pairs of electrodes being spaced intermediate said third and fourth electrodes, whereby said low-frequency alternating voltage measurement in combination with said low-frequency alternating current measurement provides an indication of the resistivity of the earth between said first and said second electrode pairs, and said depolarizing alternating current source causes a depolarizing alternating current to flow between said adjacent pairs of electrodes.

* * * * *